United States Patent [19]

Pinkerton et al.

[11] Patent Number: 4,544,485

[45] Date of Patent: Oct. 1, 1985

[54] CHROMATOGRAPHIC METHOD AND MEANS

[75] Inventors: Thomas C. Pinkerton; Helene I. Hagestam, both of West Lafayette, Ind.

[73] Assignee: Purdue Research Foundation, West Lafayette, Ind.

[21] Appl. No.: 646,153

[22] Filed: Aug. 31, 1984

[51] Int. Cl.$^4$ .............................................. B01D 15/08
[52] U.S. Cl. .................................. 210/502.1; 210/635; 210/198.2; 210/656; 436/161; 502/402; 502/403
[58] Field of Search ...................... 210/635, 656, 198.2, 210/502.1; 502/402–404, 407, 507; 436/161

[56] References Cited

U.S. PATENT DOCUMENTS

| | | | |
|---|---|---|---|
| 3,598,245 | 8/1971 | Determann et al. | 210/500 |
| 3,917,527 | 11/1975 | Shaltiel | 210/635 |
| 4,061,591 | 12/1977 | Oliver | 502/403 |
| 4,298,500 | 11/1981 | Abbott | 210/198.2 |
| 4,340,483 | 7/1982 | Lukas et al. | 210/502.1 |
| 4,376,047 | 3/1983 | Pohl | 210/502.1 |

*Primary Examiner*—John Adee
*Attorney, Agent, or Firm*—Barnes & Thornburg

[57] ABSTRACT

A novel packing material is provided for liquid chromatographic columns, having a maximum pore size around 80 angstroms, a hydrophobic coating on the inner surfaces adapted to absorb hydrophobic analytes, and a hydrophilic coating on the outer surfaces adapted to reject proteins in the analyte sample. A novel method is provided for making the packing material, wherein the packing base is coated, inside and out, with a hydrophilic substance, a hydrophobic substance is bonded to the hydrophilic substance, and the hydrophobic substance is selectively removed from the external surfaces by treatment with an enzyme of a size too large to penetrate into the pores.

19 Claims, 8 Drawing Figures

FIG. 3
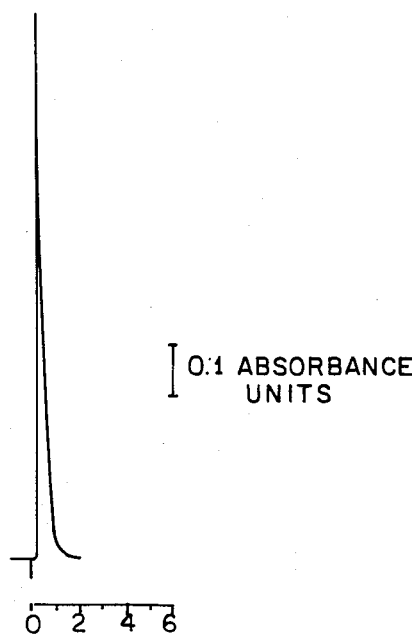
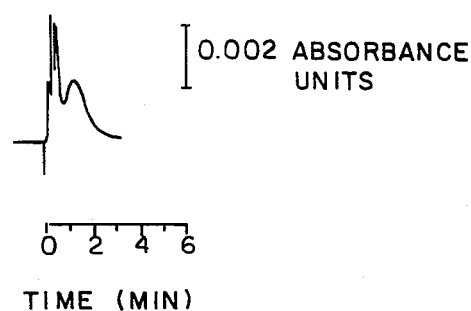
TIME (MIN)
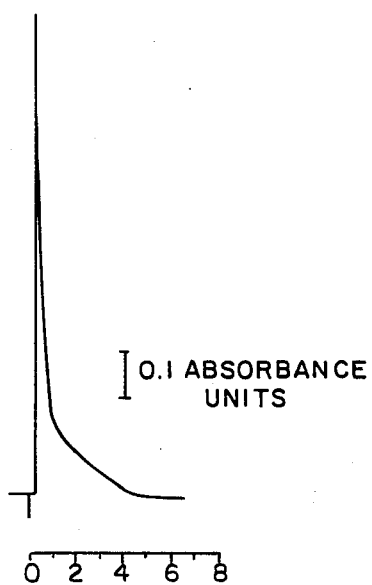
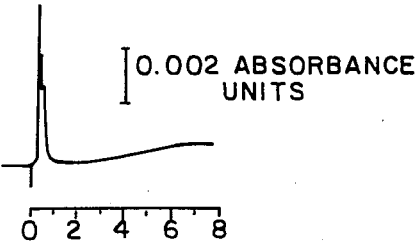
FIG. 4
TIME (MIN)

CHROMATOGRAPHIC METHOD AND MEANS

This invention relates to chromatography, and more particularly, to a novel packing support for a liquid chromatographic column having improved selectivity and longer life.

It is frequently necessary to confirm the presence of hydrophobic drug substances in blood, serum, or plasma and to measure the concentration thereof. For this purpose, liquid chromatography is an effective tool, using a so-called reverse-phase (hydrophobic) packing. Such a packing adsorbs the hydrophobic drug substances from the sample, but it also adsorbs proteinaceous substances, which tend to interfere with the subsequent fractionation of the drug substance from other hydrophobic materials contained in the sample. It is therefore necessary to carry out a preliminary sample preparation procedure. For human serum, as one example, the sample preparation is handled currently in several ways:

In the most conventional way, the proteins are precipitated, the aqueous supernatant is extracted with a water-immiscible organic solvent, the organic solvent is removed from the extract by evaporation, and the analyte residue is reconstituted in mobile phase before analysis by high-pressure liquid chromatography (HPLC). This method is very time-consuming and cost-inefficient.

A second method currently employed involves the adsorption of analytes onto a reverse-phase packing of octadecylsilane (ODS) bonded to silica in a small disposable column. Although this technique can be automated, the columns can be used for only one sample because proteins remain on the packing, and as a result the technique is also cost-inefficient for multiple samples.

In a third method, a reverse-phase packing of octadecylsilane bonded to silica is introduced into a precolumn, which is separated from, but connectable to, an analytical column by a switching valve arrangement. Serum samples are injected directly into the precolumn, where the proteins are denatured and accumulated, and the deproteinated analyte solution is passed into the analytical column for fractionation. After approximately three injections, the precolumn must be backflushed to remove the protein residue. This interruptive backflush is time-inefficient for a large number of samples. Furthermore, the octadecylsilane packing eventually deteriorates because proteins cannot be completely removed therefrom.

The present invention is a new concept in that it provides a liquid chromatographic packing material which discriminates between analyte species on the basis of their different interactions with hydrophobic internal surfaces of the packing material versus hydrophilic external surfaces.

The novel packing material of the present invention, which has been termed an Internal Surface Reverse Phase (IS-RP) liquid chromatographic packing material, is a porous support (1) having a hydrophobic partitioning phase bonded to the internal surface thereof; (2) having its external surface rendered hydrophilic so as to be non-adsorptive to proteinaceous materials found in (for example) human plasma; and (3) having a pore diameter restricted in size so that proteinaceous materials do not gain access to the internal surface bearing the hydrophobic participation phase.

The IS-RP packing support of the invention is designed to eliminate any need for sample preparation procedures heretofore required before small hydrophobic molecules (e.g., drugs) in protein-containing biological matrices (e.g., human serum or plasma) can be separated and quantified by reverse-phase high-performance chromatography. The IS-RP packing material of the invention is conveniently produced from commercially available controlled-pore particulate silica (with average pore diameter of around 100 angstroms, more or less) which has been rendered hydrophilic and non-adsorptive to proteins through the covalent bonding of glyceroylpropyl groups,

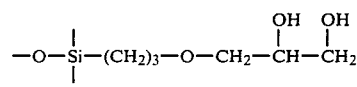

while simultaneously being reduced in pore diameter to around 80 angstroms or less, preferably 40 angstroms or less.

A hydrophobic polypeptide partitioning moiety (comprising, for example, amino acids phenylalanine, tryptophan, tyrosine, leucine, isoleucine, valine, lysine, and/or arginine) containing chemical bonds which are susceptible to enzyme cleavage is then covalently bound to some fraction of the glyceroylpropyl groups on the support packing surface via the hydroxyl functionality, using a variety of reactions for this purpose that are well known to those skilled in the art. This derivatization is carried out with molecules that can penetrate the porous particulates, so that both the internal surface as well as the external surface of the particulate will possess the hydrophobic partitioning phase. Since the hydrophobic molecules on the external surface of the particulates would be adsorptive to proteins, the packing is treated with an enzyme such as chymotrypsin, carboxypeptidase, or the like which cleaves the hydrophobic portions of the molecular partitioning phase from *only* the external surface of the particulates and not the internal surface, owing to the inability of such large enzymes to enter the porous particulate because of the small pore diameter of the latter. The chemical functionalities which remain attached to the glyceroylpropyl groups on the external surface after enzyme treatment are as non-adsorptive to proteins as the initial glyceroylpropyl-bonded material. The resulting product is the IS-RP packing supports.

Numerous starting materials are available as bases for preparing the IS-RP packing of the present invention, including silica, glass, and the like. Such materials are commercially available in great numbers, as the following illustrative list will demonstrate:
"Nucleosil" (Macherey-Nagel Co.)
"Polygosil" (Macherey-Nagel Co.)
"Ultraphere Si" (Altex Co.)
"Ultrasil Si" (Altex Co.)
"Vydac HS Silica" (Separations Group)
"μ Porasil" (Waters Associates)
"Zorbax Sil" (DuPont)
"Baker Silica gel" (Baker Chem. Co.)
"Spherisorb" (Phase Separations Ltd.)
"Controlled-Pore Glass" (Electro-Nucleonics, Inc.)
"BioSil" (Bio Rad Labs)
"LiChrosorb Si 60" (E. Merck)
"Micropack Si" (Varian Associates)

"Partisil" (Alltech Associates)
"Super Microbead Si" (Fuji-Davison Chemical Ltd.)
"Hypersil" (Separations Group)
"LiChrospher" (E. Merck)
"Chromegasorb" (E. S. Industries)
"Chrom Sep SL" (Tracor)
"HiEff Micropart" (Applied Sci. Labs.)
"ICN Silica" (ICN Inc.)
"RSL Silica" (RSL, Belgium)
"Silica A" (Perkin-Elmer)
"Sil 60" (Chrompak, Holland)

From such matrixes are prepared the "diol phases'-'—glyceroylpropyl bonded silica and the like—used in preparing the supports of the present invention. A variety of such diol phases are commercially available, e.g., the following:

"CPG Glycophase", Pierce Chemical Co. (controlled pore glass)
"Aquapore-OH", Brownlee Labs. (spherical silica)
"Lichrosorb Diol", E. Merck (irregular silica)
"Lichrospher Diol", E. Merck (spherical silica)
"TSK SW", Toyo Soda (spherical silica)
"Baker Diol", Baker Chemical Co. (spherical and irregular silica)
"Synchropack", Anspec Co. (spherical silica)

The diol phases are readily made by published methods—e.g., Larsson et al, *Advances in Chromatography*, 21 Chapter 2 (1983); Regnier and Noel, *J. Chrom. Sci.*, 14, 316 (1976); Herman et al, *J. Chrom Sci.*, 19, 470 (1981); and Ohlson et al, *FEBS Letters*, 93 (1), 5 (1978).

Glyceroylpropyl bonded silica is only one example of a diol phase suitable for use in preparing an internal surface reverse phase packing. In principle, any porous hydrophilic matrix can be used which contains a sufficient number of organic hydroxyl functionalities,

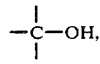

where the open carbon bonds are attached to the support or to other moieties in a known manner. Illustrative of alternative supports are hydroxyalkyl methacrylate gels ("Spheron," Lachema Inc., Brno, Czechoslovakia), hydroxylated polyether gels ("TSK-PW," Toyo Soda Manufacturing Co., Ltd., Tonda, Shinnanyo, Yamaguchi, Japan), dextran gels ("Sephadex," Pharmacia, Uppsala, Sweden), agarose gels ("Sepharose," Pharmacia), and allyl cross-linked dextran with N,N'-methylene-bis-acrylamide ("Sychacryl," Pharmacia).

A variety of hydrophobic phases can be used successfully, including, in principle, any combination of amino acids containing a hydrophobic group, as noted above, in a polypeptide which can be cleaved by an enzyme that is too large to gain entrance to the internal surface. The prospective combinations are almost limitless. Useful polypeptides include the dipeptides, tripeptides, and (with increasing difficulty of preparation), the tetrapeptides and pentapeptides). Illustrative polypeptides include glycinephenylalanine-phenylalanine, glycine-phenylalanine-isoleucine, glycine-isoleucine-isoleucine, glycine-phenylalaninetrypotophan, and the like. Also useful are N-tert-butoxycarbonylphenylalanine, N-carbobenzoxyphenylalanine, acetylphenylalanine, and benzoylphenylalanine, which are not polypeptides but are spatially similar to the polypeptides. The latter are preferably bound to the glyceroylpropyl group through a spacer, tetramethylenediamine.

Various enzymes can be used for the cleavage of the hydrophobic phase. If the peptide is attached to the supporting matrix via the terminal carboxylic acid, then chymotrypsin can be used for amino acids phenylalanine, tryptophan, and tyrosine, while trypsin can be used for lysine and arginine. If the peptide is attached to the supporting matrix via the terminal amine, pepsin can be used to cleave the entire peptide through the adjacent amino acids phenylalanine, tryptophan, tyrosine, or leucine, or preferably carboxypeptidase A can be used to cleave sequentially (i.e., one after the other) all of the amino acids with terminal carboxyl peptide linkages, with the exception of lysine and arginine, which can be cleaved with carboxypeptidase B.

The IS-RP supports are packed into liquid chromatographic columns. When a sample containing both proteins and small hydrophobic analyte molecules is introduced as a dynamic aqueous non-denaturing mobile phase, passing through the IS-RP chromatographic column, the proteins elute at the column void volume, because of the complete size exclusion from the porous IS-RP packings and because the external surface of the IS-RP supports does not absorb proteins. Small endogenous hydrophilic molecules which can penetrate the IS-RP porous packing but which do not partition with the internal hydrophobic phase are also not retained. However, the small hydrophobic analyte molecules which can penetrate the IS-RP porous packing do partition with the internal surface reverse phase and are retained for a time suitable for separation from the protein and hydrophilic small molecule matrix fraction. The device permits small hydrophobic analyte molecules to be dynamically isolated from a complex protein-containing mixture in one step. The small hydrophobic analytes can then be further separated via a conventional octadecylsilane analytical column when introduced by means of switching valves. If the IS-RP packing is made of high-performance particulates ($\leq 10$ $\mu$m), the protein isolation and analytical analyte separation can occur concomitantly on the same IS-RP column.

Thus, when packed in a liquid chromatographic column, the IS-RP support material can serve two functions. First, an IS-RP precolumn (particle diameter of supports around 30–70 $\mu$m) can be used as a one-step dynamic sample preparation technique by extracting hydrophobic small molecules from protein-containing matrices (i.e., blood serum and plasma). Second, an IS-RP analytical column (particle diameter of supports $\leq 10$ $\mu$m) can be used for the direct isolation of hydrophobic small molecules from the proteins in a matrix as well as allow for the separation of small molecular analytes from one another. These two functionalities of the novel support material permit the direct injection of protein-containing analyte mixtures (e.g., blood serum or plasma) onto liquid chromatographic systems without sample pretreatment. The isolation of the protein macromolecular fraction from the small hydrophobic analyte molecules occurs as a result of the complete size exclusion and non-adsorption of the proteins with the IS-RP support packing, thus separating the proteins into the column external void volume and isolating the small analyte molecules by absorption upon the hydrophobic internal surface, where the small analyte molecules are retained and separated thereby from the protein fraction.

If the IS-RP packing material is placed in a small precolumn connected to a typical octadecylsilane reverse phase HPLC analytical column via a switching valve arrangement, and a sample of human plasma containing a hydrophobic drug is directly injected into the IS-RP precolumn, the protein fraction is completely excluded, appearing in the precolumn void volume, while the hydrophobic drug is retained on the IS-RP column owing to penetration into the internal packing region and absorption upon the hydrophobic coating. The protein fraction is shunted off to waste, and the dynamically extracted drug fraction is then directed (via the switching valve) onto an HPLC analytical column for further separation of the drug analytes of interest.

The advantages of the packing when used in a precolumn include (1) the elimination of the sample preparation procedure (i.e., no precipitation of protein, no extraction, etc.); (2) the protection of HPLC analytical columns from contamination by endogenous proteins; and (3) stability (such packings have been subjected to approximately 100 human plasma samples without exhibiting a loss of performance in ability to extract phenytoin as the analyte).

When the IS-RP packing material is produced from a small particulate support (i.e., $\leq 10$ $\mu$m in diameter), then packed columns of greater length (15 to 25 cm) can be used to allow the direct injection of plasma samples for both the removal of proteins and the high-performance analytical separation of analytes simultaneously, without column deterioration due to protein accumulation.

In the IS-RP method, the packed columns (precolumns or analytical) can be used repeatedly for a variety of samples because the serum proteins are not retained on the column packing. The inclusion of the IS-RP packing as a part of the chromatographic system permits complete automation with direct injection of serum or plasma samples. The technique solves the problem of serum or plasma sample preparation in a completely novel and different way.

A primary commercial application for the invention will be in the HPLC determination of drugs in serum and plasma performed by the pharmaceutical industry. As an example, one pharmaceutical company is said to run HPLC analyses on approximately 30,000 serum samples per year. The importance of improving such an operation will be apparent.

BRIEF DESCRIPTION OF THE DRAWINGS

FIGS. 1–8 illustrate the packing material and its use in a chromatographic system.

The following operating example will illustrate the invention. It is to be understood that the example is illustrative only, and is not submitted by way of limitation.

EXAMPLE

*Support.* A convenient starting material for the IS-RP packing of the present invention is the glyceroylpropyl-bonded controlled-pore glass supporting material CPG/40 Glycophase TM, supplied by Pierce Chemical Company, Rockford, Ill. 61105, Catalog No. 24827, having a nominal pore diameter of 40 angstroms and a particle size of 37–74 $\mu$m.

Figure 1:
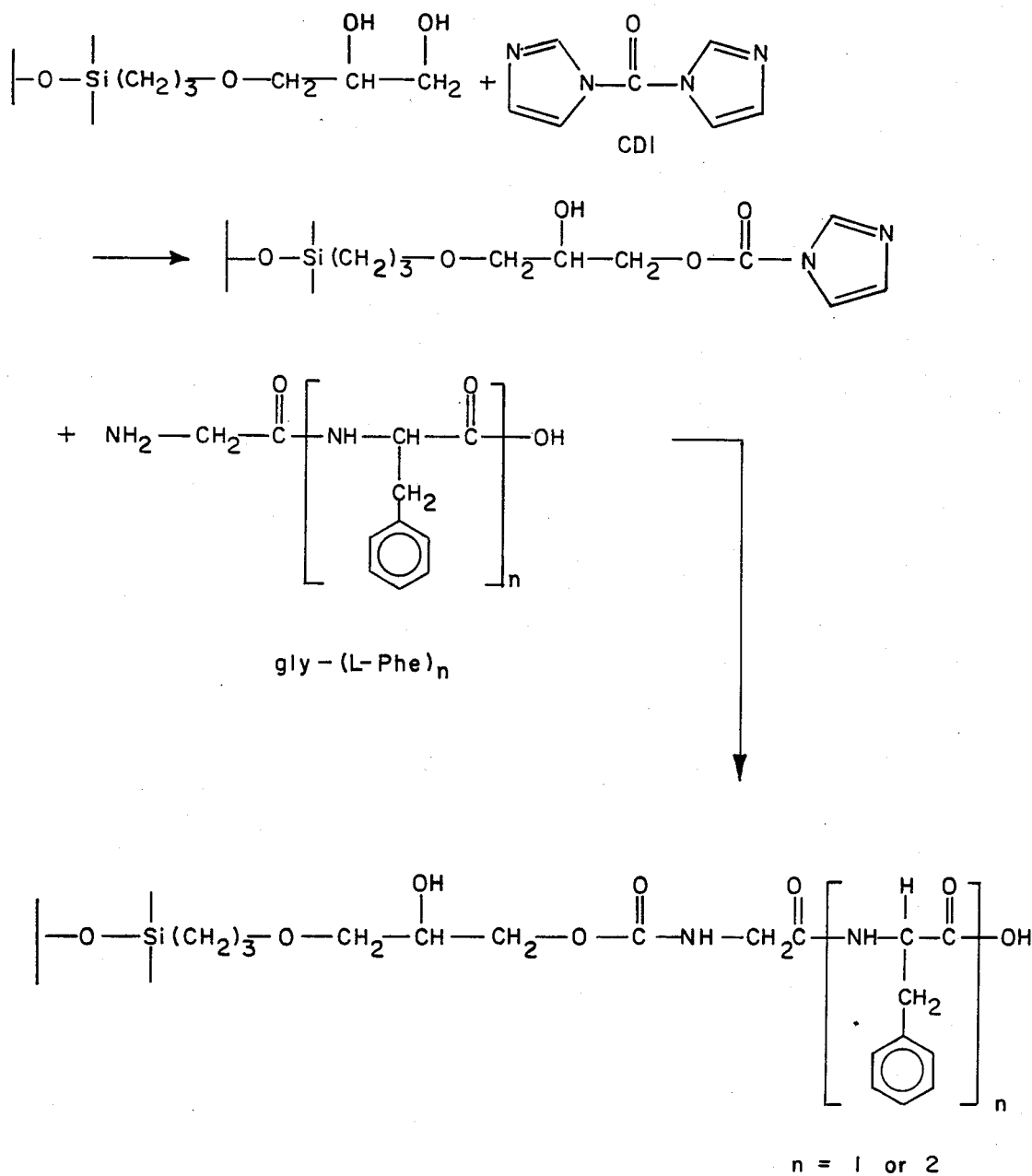

*Hydrophobic partitioning phase.* Two variant packings were made in which the hydrophobic partitioning phases were respectively dipeptides and tripeptides containing a terminal glycine moiety (gly) and one or two L-phenylalanine (L-Phe) moieties. Using the well-known carboxyldiimidazole (CDI) binding method, the peptides were attached to the CPG/40 Glycophase support by way of the glyceroylpropyl functionalities already existing thereon. The reaction scheme is outlined in FIG. 1 of the attached drawings.

*Dipeptide ("G40-gph$_1$").* Approximately 1 g of CPG/40 Glycophase was first rinsed with 20 mL of dimethylformamide, solvent exchanged with dioxane, combined with 400 mg of 1,1-carbonyldiimidazole (CDI) dissolved in 3 mL of dioxane, and allowed to react with gentle shaking for 4 hours (Bethell et al, *J. Biol. Chem.*, 254, 2572 (1979); *J. Chrom..* 219, 361 (1981)). The CDI-activated CPG/40 Glycophase was washed with 50 mL of dioxane, 100 mL of water, and 20 mL of borate buffer, then transferred immediately to 2 mL of 0.1 M borate buffer (pH 8.5) containing approximately 0.3 mmol (67 mg) of glycine-L-phenylalanine dipeptide. The CDI activated CPG/40 Glycophase and the gly-L-phe dipeptide were allowed to react for 2 to 3 days with gentle shaking in the borate buffer. The derivatized CPG/40 Glycophase material was then rinsed with 50 mL of borate buffer, 50 mL of 1 M NaCl, and 50 mL of H$_2$O.

*Tripeptide ("G40-gph$_2$").* In the case of the IS-RP tripeptide, glycine-L-phenylalanine-L-phenylalanine, 0.27 mmol (100 mg) of the tripeptide was dissolved in 4 mL of N-methylformamide over a steam bath prior to combination with the CDI-activated CPG/40 Glycophase, which had been washed with and subsequently dispersed in N-methylformamide. The CDI-activated CPG/40 Glycophase and the gly-L-phe-L-phe tripeptide were allowed to react for 2 to 3 days with gentle shaking in the N-methylformamide, and were then given a final wash with n-methylformamide and water.

*Enzyme cleavage of external phase.* The polypeptide moieties on the external surface of the derivatized CPG/40 Glycophase were removed by cleavage with carboxypeptidase A (an exopeptidase which hydrolyzes carboxyl terminal amino acid linkages). Carboxypeptidase A is most active in the cleavage of aromatic amino acids, compared to other amino acids, and has been previously demonstrated to remove amino acids from solid supports in amino acid sequencing (Williams et al, *FEBS Letters*, 54, 353–357 (1975)). In previous work, where the amino acid sequencing of unknown peptides was the aim, large pore diameter solid supports around 500 angstroms were employed to allow penetration of proteins. In the application described here, however, the pore diameter of the peptide bonded CPG/40 Glycophase support is about 40 angstroms; so the large carboxypeptidase A (around 34,000 daltons) is confined to the outermost parts of the packing, cleaving the polypeptide only from the external surface of the particulates.

*Enzyme cleavage procedure.* Approximately 1 g of the peptide-bonded CPG/40 Glycophase support was combined with 1 mg of carboxypeptidase A in 2 mL of 0.01 M phosphate buffer (pH 7.8) and allowed to incubate with occasional shaking for around 12 hours at 37° C., at which point cleavage was essentially complete. The enzyme was then washed from the IS-RP support with 50 mL aqueous 0.01 M orthophosphate buffer followed by 50 mL aqueous 1.0 M sodium chloride. The support was then washed sequentially with 50 mL of H$_2$O, 50 mL distilled methanol, and 50 mL of H$_2$O for removal of cleaved phenylalanine.

*Determination of percent coverage of partitioning phase.* In order to determine the amount of polypeptide bound to the CPG/40 Glycophase both before and after enzyme treatment, the packings were subjected to acid hydrolysis (6N HCl for 24 hours, 100° C.) leaving the phenylalanine moieties free in solution. Subsequent quantification of the released phenylalanine moieties by reverse phase HPLC with optical detection at 254 nm revealed the amount bound to the CPG/40 Glycophase support. In typical cases after a single synthesis, the packing contained 0.17 mmol of the dipeptide per gram and 0.04 mmol of the tripeptide per gram before enzyme treatment, and 0.10 mmol and 0.02 mmol respectively after enzyme treatment (Table 1).

*Repetitive synthesis.* If the percent coverage of the hydrophobic phase on the internal surface, after the enzyme cleavage, was insufficient to render the surface sufficiently hydrophobic for adequate retention of the analyte, then the synthesis and enzyme cleavage were repeated on the same material.

Performance evaluation of a model IS-RP material (a) *Test analyte.* The hydrophobic analyte molecule used to evaluate the performance of the model IS-RP material was phenytoin (5,5-diphenylhydantoin).

(b) *Test macromolecular matrix.* The protein matrices included purified standard human serum albumin and human plasma.

Figure 2:
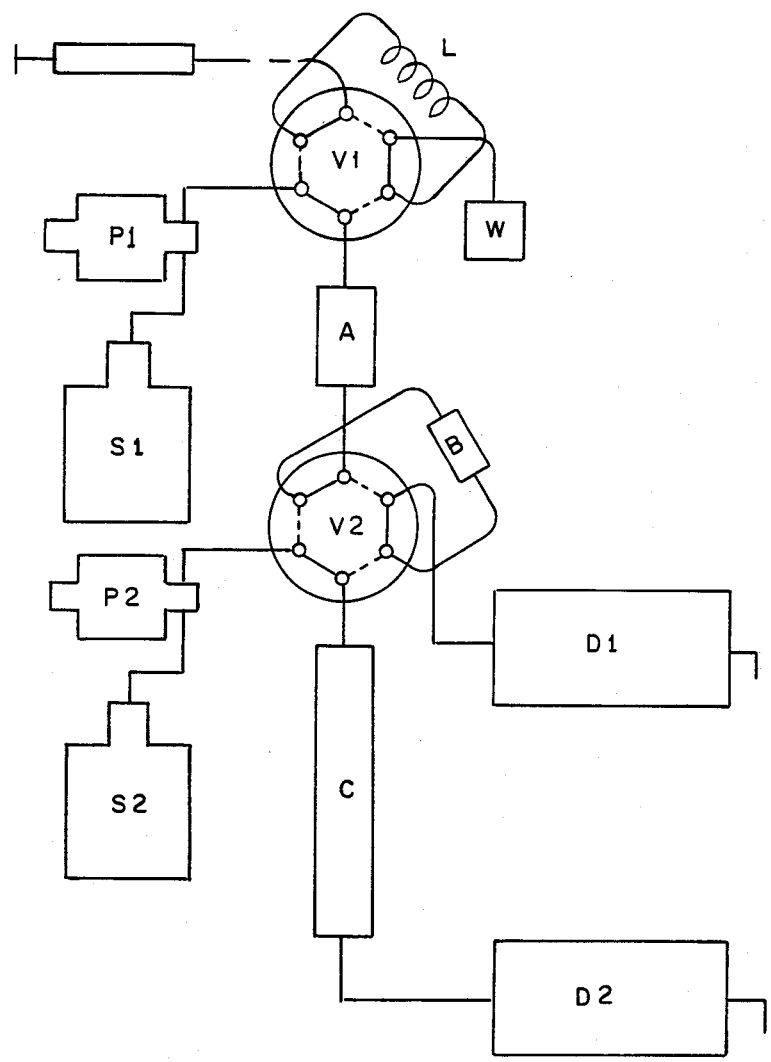

(c) *Liquid chromatographic system.* The model IS-RP material was tested in a precolumn extraction mode in conjunction with a conventional octadecylsilane analytical column, as illustrated in the attached FIG. 2. The IS-RP material was packed into a 3 mm ID × 100 mm L glass precolumn (A) which was placed between a 6-port slider injection valve (V1) and a 6-port switching valve (V2) connected to a 25 cm analytical octadecylsilane column (C). A short 5 cm portion of an analytical octadecylsilane column was used in conjunction with valve V2 in order to trap the eluting phenytoin from the IS-RP precolumn, for transfer to the analytical column.

(d) *Test procedure.* The protein sample matrix containing the phenytoin analyte was introduced to the IS-RP precolumn via the injection valve (VI) with pumping (PI) of a sample-compatible aqueous eluent S1 (0.1 M orthophosphate/0.2 M Na$_2$SO$_4$, pH~6.0 at a flow rate of 1.5 mL/min). Eluent S1 was passed through the IS-RP precolumn, valve V2 (in the position indicated by the dotted lines), and detector (D1), this comprising the low-pressure extraction system. Simultaneously eluent S2 (20% acetonitrile/33% methanol/47% 0.12 M orthophosphate buffer, pH~6.0) was pumped (P2) at a flow rate of 1.0 mL/min via valve V2 (dotted-line position) through octadecylsilane columns B and C to detector D2, this comprising the high-pressure analytical separation system.

On introduction of a sample, the proteins are eluted at the void of the IS-RP precolumn (A) through valve V2 (dotted-line position) to detector D1. After the elution of the proteins, valve V2 is switched (solid-line position); and the hydrophobic analyte, having been retained on the IS-RP column, is shunted onto column B. When all of the analyte is trapped on column B, switching valve V2 is returned to its original state (dotted-line position) and the analyte is eluted onto column C with the organic mobile phase (S2) for analytical separation on the octadecylsilane column and quantification by detector D2.

*Test results.* Data from the performance evaluation of the two model IS-RP packing materials, dipeptide (G40-gph$_1$) and tripeptide (G40-gph$_2$), both enzyme-treated (IS-RP) and non-enzyme-treated (ES-IR-RP) are given in Table 1.

TABLE 1

Performance Evaluation of Model Internal Surface Reverse Phase (IS-RP) Packing Supports

| Partitioning Phase | Enzyme Cleavage | Phase[3] Coverage μmol/g | Percent Phase Removed | Analyte Retention k'[4] | N[5] | Protein Elution Percent Recovery[6] of HSA |
|---|---|---|---|---|---|---|
| G40-gph$_1$ | ES-IS-RP[1] (untreated) | 166 | — | 9.6 | 180 | 84 |
| | IS-RP[2] (Enzyme treated) | 96 | 42 | 8.4 | 190 | 105 |
| G40-gph$_2$ | ES-IS-RP (untreated) | 42[7] | — | 16.2 | 120 | 98 |
| | IS-RP[2] (Enzyme treated) | 16 | 61 | 11.4 | 240 | 102 |

[1]ES-IS-RP, External Surface and Internal Surface Reverse Phase.
[2]External phase removed with carboxypeptidase A.
[3]Partitioning Phase coverage in μmol of peptide phase per gram of support.
[4]Capacity factor (k') of phenytoin on IS-RP column (3 mm I.D. × 100 mm L). k' = $(t_R-t_M)/t_M$, where $t_M$ is retention time of mobile phase and $t_R$ is retention time of phenytoin.
[5]N is IS-RP column efficiency relative to phenytoin in plates per meter. N = 160 $(t_R/w)^2$, where w is width of peak.
[6]Relative % recovery of standard human serum albumin (HSA) from packing material, compared to underivated CPG/40 Glycophase on first injection with aqueous mobile phase (0.1 M orthophosphate/0.20 M Na$_2$SO$_4$, pH~6.0, flow rate 1 mL/min).
[7]Higher Phase coverages can be achieved with the G40-gph$_2$ by optimizing the tripeptide synthesis (e.g., 64 μmol/g for untreated and 47 μmol/g for treated support).

The ability of the IS-RP packing material to allow human serum proteins to pass through the system without being adsorbed is governed by a unique combination of properties and treatments including (i) the relative ratio of residual glyceroylpropyl groups to peptide moieties on the support surface; (ii) the quasi-compatible nature of the peptides to the serum proteins; (iii) the removal of finite amounts of the peptide from the external surface by enzyme cleavage; 2and (iv) the small nominal pore diameter (≦40 angstroms) of the packing. With an initial surface coverage of glyceroylpropyl bonded phase on the CPG/40 Glycophase of 339 μmol/g, the G40-gph$_1$ yielded a 166 μmol/g (49%) total coverage (internal and external) of the peptide phase, of which 42% was removed by enzyme cleavage. The G40-gph$_2$ yielded a 42 μmol/g (12%) total peptide coverage, 61% of which was removed by enzyme cleavage (Table 1). When the hydrophobic peptide is left on the exernal surface, a greater protein adsorptivity and lower recovery of protein from the packing are observed. Even the smallest percentage of serum protein remaining on the column is unacceptable for optimum performance, since the column would eventually lose its capacity to retain the analyte as the proteins accumulate. From supports that had not been treated with enzyme to remove hydrophobic peptides, the percent recovery of standard human serum albumin (HSA) on elution with the aqueous mobile phase ranged from around 80 to 95%. The percent recovery of HSA from the enzyme-treated IS-RP supports was 100% ±2% in every case.

Elution of human plasma and phenytoin from underivatized CPG/40 Glycophase (i.e., without addition of polypeptide) is illustrated in FIG. 3.

The elution of plasma and phenytoin from the tripeptide-derivatized CPG/40 Glycophase without removal of the hydrophobic phase from the external surface by enzyme treatment (ES-IS-RP) is illustrated in FIG. 4.

Figure 5:
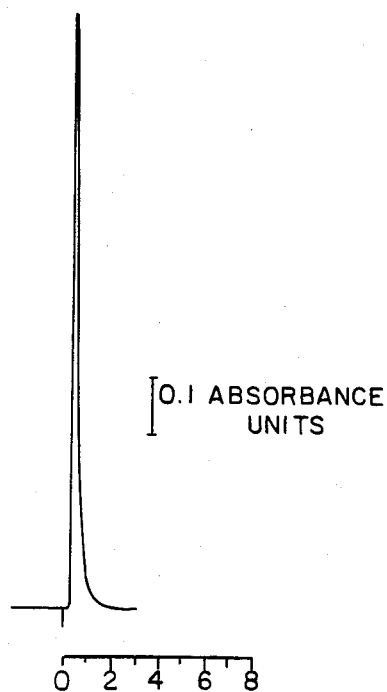

Elution of human plasma and phenytoin for a model IS-RP column of the present invention is illustrated in FIG. 5. The extreme tailing experienced by the packing with peptide phase on the external surface (FIG. 4) severely obscures the elution of the hydrophobic analyte; thus the analyte could not be isolated from the proteins with the untreated column.

The protein elution from the IS-RP column does not exhibit such tailing (FIG. 5), thus enabling isolation of the analyte.

The elution of the phenytoin analyte from the peptide columns is illustrated in FIGS. 4 and 5. The capacity factor ($k'$) for the fully covered peptide supports was greater than the IS-RP columns (Table 1), and the capacity factor of the tripeptide (G40-gph$_2$) was greater than the dipeptide (G40-gph$_1$), as expected. The retention of the phenytoin on the IS-RP columns was sufficient for column switching isolation of the phenytoin from the plasma proteins.

The efficiency of the IS-RP columns was found to be superior to that of the non-enzyme-treated material (Table 1). This is believed to be due to a widening access of the pore entrance region by removal of the peptide moieties from the external surface.

Figure 6:
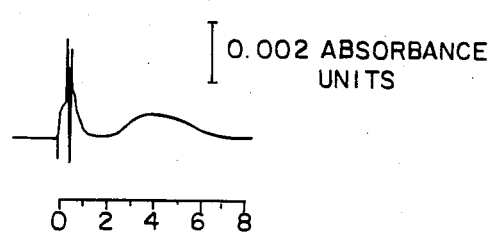
Figure 6:
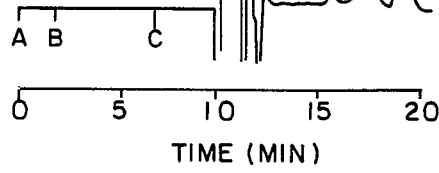

Quantitative extraction of the phenytoin from human plasma by the IS-RP G40-gph$_2$ was demonstrated by trapping the phenytoin onto the octadecylsilane column B (FIG. 2), after elution from the IS-RP column. Subsequent shunting of the trapped analyte onto the octadecylsilane column C (FIG. 2) permits HPLC quantification of the phenytoin (FIG. 6) by peak height measurement with fixed wavelength detection at 254 nm.

Figure 7:
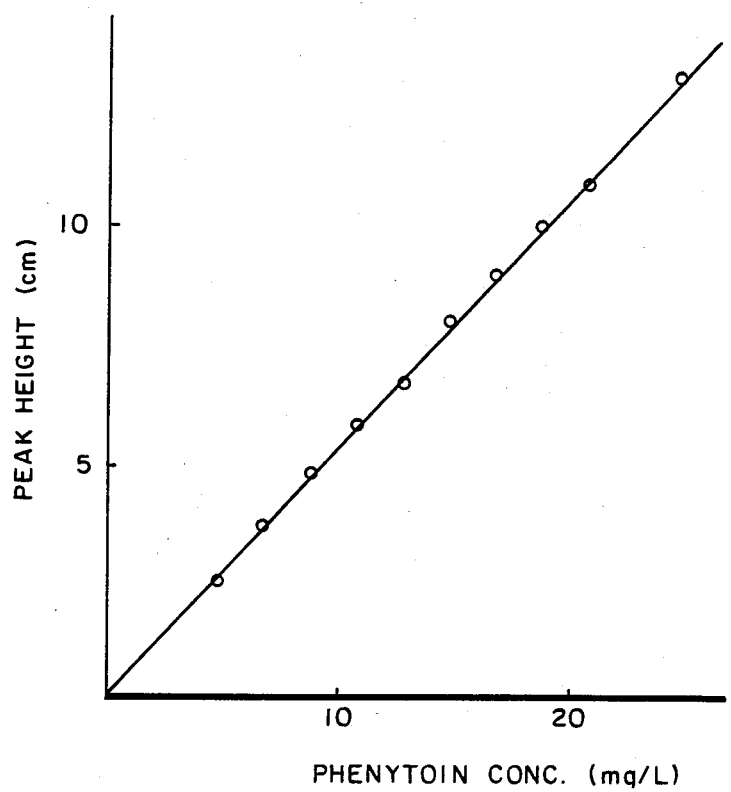

A calibration curve generated by this method, over a concentration range of 5 $\mu$mL to 25 $\mu$g/mL of phenytoin in methanol, is illustrated in FIG. 7.

Figure 8:
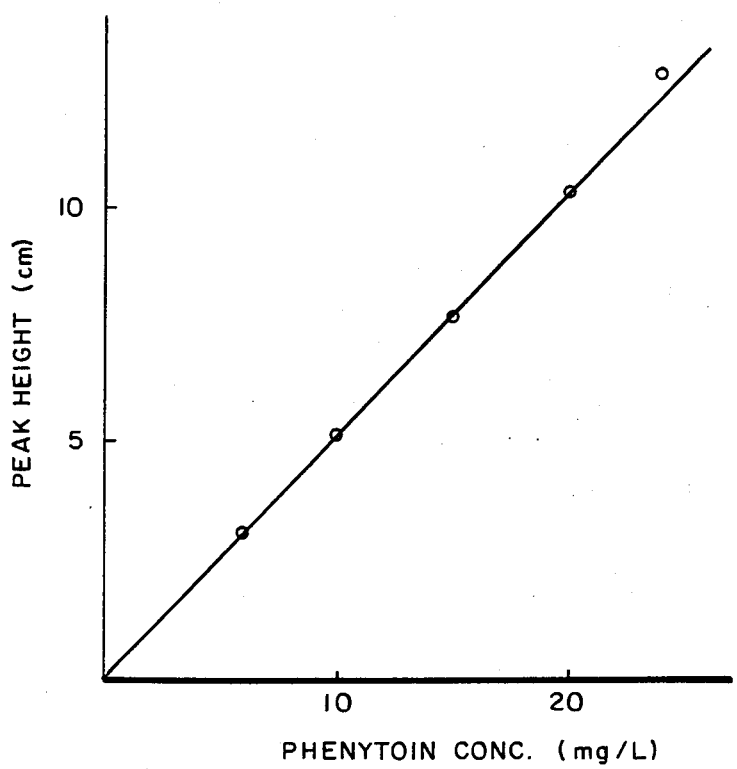

The linearity over the same concentration range for the phenytoin in human plasma is illustrated in FIG. 8.

The recovery of the phenytoin from human plasma on extraction by the IS-RP method ranged from around 97 to 100% of the phenytoin added to the protein matrix, when compared to phenytoin dissolved in methanol and extracted with the same IS-RP procedure. Since it is known that the phenytoin protein binds to human serum albumin in excess of 90%, this means that the protein-bound phenytoin is released on introduction to the IS-RP column. Ultrafiltration studies indicate that this release is not due to displacement by constituents in the aqueous mobile phase, and that a high percentage of the phenytoin was indeed protein bound in the protein matrix prior to injection onto the IS-RP column. It was initially anticipated that the IS-RP columns would extract only the free, unbound phenytoin from the protein malrix; however, the model IS-RP column indicates that the total concentration of analyte is extracted. The exact reason why the IS-RP column stimulates the release of the phenytoin from the human serum albumin is not clear; however, this appears to be a unique property of the model IS-RP column.

The relative accuracy of quantifying the total phenytoin concentration from a human plasma sample by the IS-RP precolumn extraction method was found to be, on the average, 2.1% of the amount of analyte present; whereas, the precision (i.e., "coefficient of variation") in repetitive measurements was found to be, on the average, 2.5%, as shown in Table 2.

TABLE 2

Quantification of Phenytoin from Human Plasma with IS-RP Precolumn Extraction Method[1]

| Phenytoin Concentration Added to Human Plasma ($\mu$g/mL) | Measured Phenytoin Concentration[2] with IS-RP Method ($\mu$g/mL) | Coefficient of Variation (%) | Relative Accuracy (%) |
|---|---|---|---|
| 6.00 | 5.83 ± 0.11 | 1.9 | 2.8 |
| 10.00 | 9.84 ± 0.22 | 2.2 | 1.6 |
| 15.00 | 14.71 ± 0.62 | 4.2 | 1.9 |
| 20.00 | 19.93 ± 0.51 | 2.6 | 0.4 |
| 24.00 | 24.93 ± 0.48 | 1.9 | 3.9 |
| Averages: | | 2.5 ± 1.0 | 2.1 ± 1.3 |

[1]IS-RP column G40-gph$_2$.
[2]Mean ± standard deviation with 3 to 4 replicate measurements (using calibration curve FIG. 7).

The IS-RP G40-gph$_2$ model column has been subjected to approximately 100 human plasma sample analyses of phenytoin, and no evidence of deterioration or change in column performance has been observed.

The IS-RP packing support of the present invention represents a new concept in liquid chromatographic packing material. The partitioning of small hydrophobic analyte molecules with hydrophobic peptide bonded phases confined to the internal surface of rigid hydrophilic supports with controlled pores of $\leq 80$ angstroms diameter, preferably $\leq 40$ angstroms, makes possible the dynamic one-step isolation of small hydrophobic analytes from matrices containing large macromolecular proteins. The fundamental concept behind the design of the IS-RP packing supports and the utilization of enzymes for removing the hydrophobic partitioning phase from the external surface of the support is unique among liquid chromatographic packing materials.

What is claimed is:

1. An internal surface reverse phase packing material for liquid chromatographic columns which comprises a porous support having a pore size sufficiently small to prevent the entry of proteinaceous materials into the said packing material, a hydrophobic partitioning phase bonded only to the internal surface thereof, and a hydrophilic partitioning phase bonded to the external surface thereof, whereby proteinaceous substances in an analyte mixture are rejected by the said packing material, while hydrophobic components of the said analyte mixture are adsorbed and retained in the said packing material.

2. The packing material of claim 1 wherein the said porous support is silica.

3. The packing material of claim 1 wherein the said porous support is glass.

4. The packing material of claim 1 wherein the pore size is equal to or less than about 80 angstroms.

5. The packing material of claim 1 wherein the pore size is less than about 40 $\mu$m.

6. The packing material of claim 1 wherein the particle size is less than about 10 $\mu$m.

7. The packing material of claim 1 wherein the said hydrophilic partitioning phase is comprised of glyceroylpropyl groups bonded to silica.

8. The packing material of claim 1 wherein the said hydrophobic partitioning phase is composed of polypeptide groups bonded through glyceroylpropyl groups to silica.

9. The packing material of claim 8 wherein the said polypeptide groups are glycine-L-phenylalanine.

10. The packing material of claim 8 wherein the said polypeptide groups are glycine-L-phenylalanine-L-phenylalanine.

11. A method for making an internal surface reverse phase packing material for liquid chromatographic columns, which comprises bonding to internal and external surfaces of a porous support a hydrophilic partitioning phase, whereby the pore diameter of the porous support is reduced to a size sufficiently small to prevent the entry of proteinaceous materials into the said packing material, bonding to the said hydrophilic partitioning phase on the internal and external surfaces of the said porous support a hydrophobic partitioning phase, and enzymatically removing the said hydrophobic partitioning phase from the external surface of the said porous support.

12. A method for making an internal surface reverse phase packing material for liquid chromatogrpahic columns, starting with a porous support having a pore diameter of a size sufficiently small to prevent the entry of proteinaceous materials into the said packing material, and having a hydrophilic partitioning phase bonded to the internal and external surfaces thereof, which comprises bonding to the said hydrophilic partitioning phase on the internal and external surfaces of the said porous support a hydrophobic partitioning phase, and enzymatically removing the said hydrophobic partitioning phase from the external surface of the said porous support.

13. The method of claim 11 wherein the said hydrophilic partitioning phase is composed of bound organic hydroxyl groups.

14. The method of claim 11 wherein the said hydrophilic partitioning phase is composed of glyceroylpropyl groups bonded to silica.

15. The method of claim 11 wherein the said hydrophobic partitioning phase is composed of polypeptide groups bonded through glyceroylpropyl groups to silica.

16. The method of claim 15 wherein the said polypeptide groups are glycine-L-phenylalanine.

17. The method of claim 15 wherein the said polypeptide groups are glycine-L-phenylalanine-L-phenylalanine.

18. The method of claim 11 wherein the said hydrophobic partitioning phase is removed from the external surface of the said porous support by treatment with carboxypeptidase A.

19. The method of claim 11 wherein the said hydrophobic partitioning phase is removed from the external surface of the said porous support by treatment with chymotrypsin.

* * * * *